(12) United States Patent
Roach et al.

(10) Patent No.: US 8,545,340 B2
(45) Date of Patent: Oct. 1, 2013

(54) GOLF CLUB WITH DIRECTIONAL BASED GRAPHIC

(75) Inventors: Ryan L. Roach, Carlsbad, CA (US); Peter L. Soracco, Carlsbad, CA (US)

(73) Assignee: Cobra Golf Incorporated, Carlsbad, CA (US)

( * ) Notice: Subject to any disclaimer, the term of this patent is extended or adjusted under 35 U.S.C. 154(b) by 465 days.

(21) Appl. No.: 12/556,608

(22) Filed: Sep. 10, 2009

(65) Prior Publication Data

US 2011/0059808 A1 Mar. 10, 2011

(51) Int. Cl.
- A63B 69/36 (2006.01)
- A63B 53/00 (2006.01)
- A63B 53/10 (2006.01)
- A63B 53/12 (2006.01)

(52) U.S. Cl.
USPC ........... 473/219; 473/221; 473/223; 473/226; 473/238; 473/241; 473/242; 473/316; 473/257

(58) Field of Classification Search
USPC ......................................... 473/219–257, 316
See application file for complete search history.

(56) References Cited

U.S. PATENT DOCUMENTS

| | | | | |
|---|---|---|---|---|
| 1,475,430 A * | 11/1923 | Curwen | | 40/454 |
| 2,264,194 A | 11/1941 | Wuestman | | |
| 2,833,176 A | 5/1958 | Ossoinak | | |
| 2,919,491 A * | 1/1960 | Darrell et al. | | 33/334 |
| 2,929,631 A | 3/1960 | Gillon | | |
| 3,468,545 A * | 9/1969 | Anderson | | 473/268 |
| 3,538,632 A | 11/1970 | Anderson | | |
| 3,582,329 A | 6/1971 | Ivanov | | |
| 3,689,346 A | 9/1972 | Rowland | | |
| 3,989,257 A | 11/1976 | Barr | | |
| 4,037,343 A | 7/1977 | Lonsmin | | |
| 4,317,568 A * | 3/1982 | Green | | 473/238 |
| 4,327,916 A * | 5/1982 | Shiratori | | 473/238 |
| 4,920,039 A | 4/1990 | Fotland et al. | | |
| 4,927,151 A * | 5/1990 | Ronnick | | 473/241 |
| 5,026,062 A * | 6/1991 | Freeberg | | 473/238 |
| 5,158,297 A * | 10/1992 | Johnson | | 473/238 |
| 5,228,695 A | 7/1993 | Meyer | | |
| 5,480,151 A * | 1/1996 | Adams | | 473/238 |
| 5,643,099 A * | 7/1997 | Solheim | | 473/238 |
| 6,439,735 B1 | 8/2002 | Shu | | |
| 7,172,517 B1 * | 2/2007 | Phelps et al. | | 473/316 |
| 7,186,185 B2 | 3/2007 | Nagy | | |
| 2004/0266542 A1 * | 12/2004 | Goldsmith | | 473/238 |
| 2008/0076593 A1 * | 3/2008 | Costa et al. | | 473/316 |
| 2009/0120197 A1 * | 5/2009 | Golden et al. | | 73/775 |

FOREIGN PATENT DOCUMENTS

| | | |
|---|---|---|
| GB | 2436071 | 9/2007 |
| JP | 5-329233 | 12/1993 |
| JP | 2008-022897 | 2/2008 |

OTHER PUBLICATIONS

Partial European Search Report for Application No. 10176221.9, dated Jan. 4, 2011, in 7 pages.

* cited by examiner

*Primary Examiner* — Sebastiano Passaniti
(74) *Attorney, Agent, or Firm* — Mark S. Leonardo; Brown Rudnick LLP

(57) ABSTRACT

A golf club having at least one directional based graphic on the golf club it disclosed. More specifically, the golf club in accordance with the present invention will have at least one directional based graphic that will only be visible when the golf club is oriented in a desirable direction while staying invisible in all other undesirable directions.

10 Claims, 12 Drawing Sheets

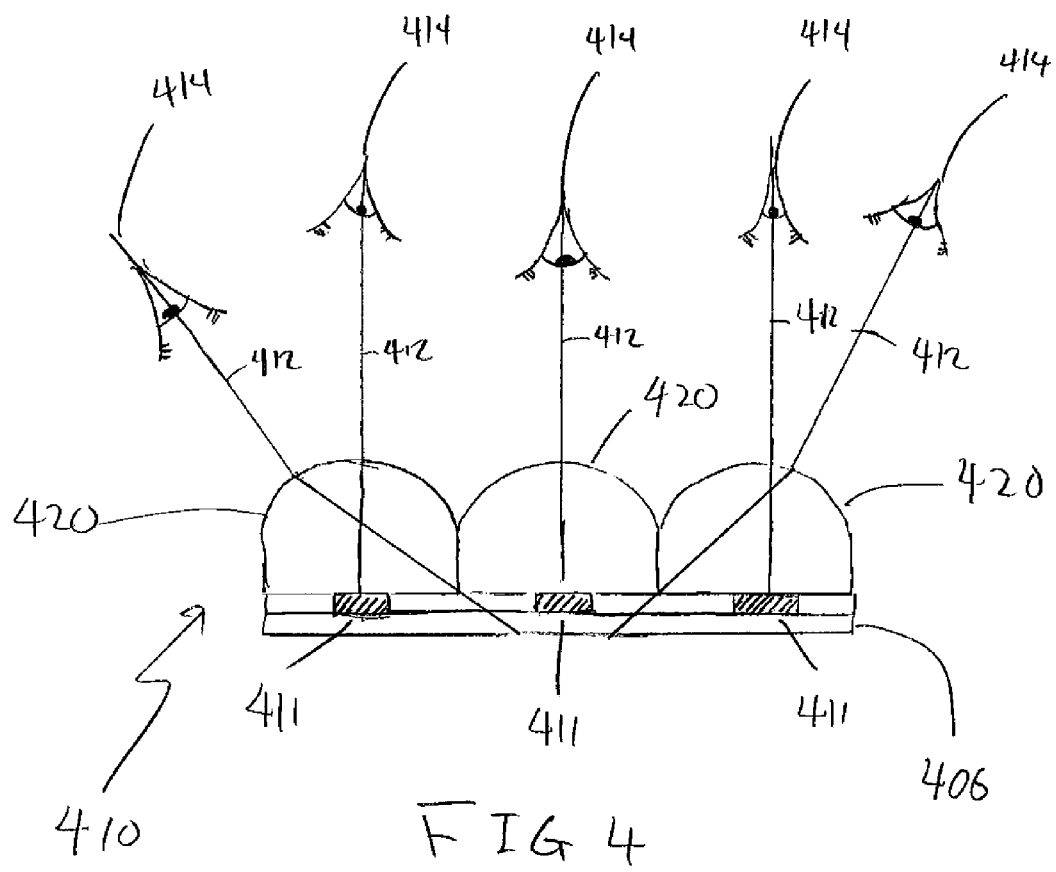

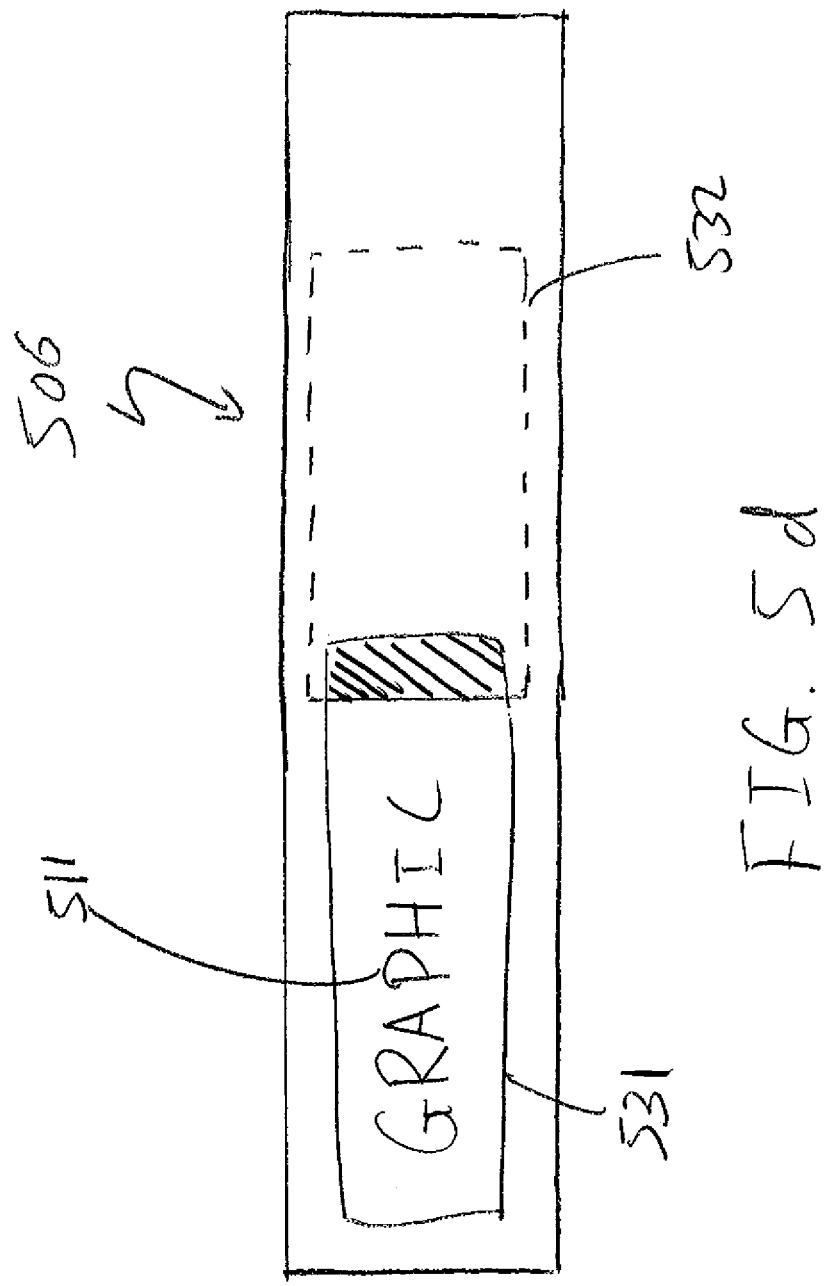

GOLF CLUB WITH DIRECTIONAL BASED GRAPHIC

FIELD OF THE INVENTION

The present invention relates generally to a golf club with directional based graphics. More specifically, the present invention relates to a golf club having at least one directional based graphic that are only visible when the golf club is oriented in a preferred direction, while becoming completely invisible in other undesirable directions. Even more specifically, the present invention relates to a golf club wherein the directional based graphic could be applied to the shaft of the golf club, the crown of the golf club, the hosel of the golf club, or even the ferrule of the golf club all offering graphic that are only visible when the golf club is oriented in a specific desirable direction.

BACKGROUND OF THE INVENTION

Golf club designs have evolved significantly since the inception of the game of golf. Although it may be hard to imagine, but the game of golf started with wooden drivers and crude iron clubs having names such as cleeks, mashies, and niblicks. Since then, golf club technology has evolved into 460 cubic centimeter (CC) oversized drivers, multimaterial cavity back irons, and even adjustable weighted putters.

While the game of golf has struggled to strike the correct balance between technology and tradition, there is no question that technological advancements within the golf equipment industry have changed the way the game is played. Putter type golf clubs have evolved to contain various weighting or alignment technology to allow for a more consistent putting swing. Wedge type golf clubs have evolved to contain various groove configurations allowing for better backspin by treading more water and debris from the surface of the wedge. Iron type golf clubs have evolved to be made from various different materials having various different geometries that may even contain hollow cavities for more forgiveness and a higher trajectory. Finally, it is arguable that driver type golf clubs have made the most significant technical stride by incorporating technological advancements such as exponentially increasing the volume of the head, utilizing a combination of alternative materials for the driver head itself, lowering the center of gravity of the driver head, and even new ways to adjust the connectivity between a driver head and its shaft to create a driver capable of achieving multiple various orientations.

In line with the technological advancements, alignment of a golf club with its intended target line has always been one of the most important aspects of the golf game. In response to this need, golf clubs have been manufactured to contain various alignment aids to help a golfer properly align their golf clubs with the intended target. Take for example U.S. Pat. No. 3,989,257 to Barr titled Golf Putter ('257 Patent) discloses a golf putter apparatus having a putter head with a front driving face having convex, horizontal, and vertical curves each approximating ellipse where a striking point indicator is located on top of the putter head so that striking a golf ball on the driving face of the putter head at the approximate indicated striking point will compensate for minute movement of a golfer's wrist.

Alignment aids have also been used in driver type golf club heads as indicated in U.S. Pat. No. 7,186,185 to Nagy titled Gold (Sic) Club with Customizable Alignment Sighting and Weighting Device ('185 Patent). The '185 Patent relates generally to a customizable alignment sighting device for a golf club that is mounted to an upper surface of the head of the golf club with a sighting element providing the user a visual target indicator for desirable alignment of the club head with the user's line of sight. When not aligned, the sighting element provides an indication of the magnitude and direction of misalignment.

In addition to the numerous attempts to place alignment marks on the crown or top portion of a golf club, other unconventional locations have been utilized to place such alignment marks. U.S. Pat. No. 5,228,695 to Meyer titled Golf Club Including Alignment Device ('695 Patent) places such an alignment device on the shaft axis and discloses a golf club provided with an alignment device for indicating when the face of the club is properly aligned. The alignment device comprises a linearoptic screen or lenticular decal which provides a three-dimensional indicator, such as a line which appears below the top surface of the screen for indicating when the face is aligned.

Although these attempts to help align the golf club to the target do a good job at indicating when a golf club is in alignment, they may interfere with the vision of a golfer and could distract the golfer from the actual execution of the shot. Once the golfer confirms the proper alignment of the golf club, the golfer's focus generally shifts to performing the golf swing, during which he may not want to be distracted by an alignment device that could disrupt his concentration. Hence, it would be ideal for a golf club to contain an alignment device that would only appear when the golfer is concerned with his alignment, and would disappear once proper alignment is reached.

In addition to the above, the technological advancement of adjustable hosels within a driver type golf club head has created an additional distraction for a golfer when the golfer attempts to execute a golf shot. More specifically, when golf club shafts were designed to be assembled in a singular orientation, the shaft graphic can be placed on the bottom portion of the shaft facing away from the golfer so the golfer does not see any of the shaft graphic when looking at a golf club from an address position. Having the shaft graphic pointed away from the line of sight of a golfer gives the shaft the much needed aesthetics appeal while not distracting the golfer when the golfer actually executes a golf shot. However, when a golf club incorporates an adjustable hosel that rotates the shaft to achieve different performance characteristics, the orientation of the graphic on the shaft turns with the golf club relative to the shaft, it results in the shaft graphic being at odd orientations to a prospective golfer when he is trying to execute a golf shot, rendering the shaft graphic to be a distraction for the golfer.

It can be seen from the above that there is a need in the field for a golf club with directional based graphic that may be used to help a golfer ensure proper alignment of the golf club. Additionally, there is a need in the field for a golf club having directional based graphic on the shaft that would only appear in a desirable direction and be completely invisible in another direction to avoid distracting a golfer during a swing. More specifically, these directional based shaft graphic should be visible only when viewed from a preferred direction while remaining completely invisible from an undesirable direction. Consequently, there is a need in the field for a golf club with directional based graphic that can be used for alignment purposes as well as serve the purpose of providing graphic display on the shaft while all at the same time being capable of being invisible in an undesirable orientation.

BRIEF SUMMARY OF THE INVENTION

One aspect of the present invention is directed to a golf club comprising a grip, a head, and a shaft. The grip is located at a proximal end of the golf club. The head is located at a distal end of the golf club. The shaft is connected between the grip and the head. The shaft of the golf club is further comprised of an at least one directional based graphic that is only visible from a desirable angle while being invisible from an undesirable angle.

In another aspect of the present invention is a golf club comprising of a grip, a head, and a shaft. The grip is located at a proximal end of the golf club. The head is located at a distal end of the golf club. The shaft is connected between the grip and the head. The head of the golf club further comprises of at least one directional based graphic that is only visible from a desirable angle while being invisible from an undesirable angle.

In a further aspect of the present invention, a golf club comprises a grip, a head, and a shaft. The grip is located at a proximal end of the golf club. The head is located at a distal end of the golf club. The shaft is connected between the grip and the head. The golf club may further comprise of at least one directional based graphic that is only visible from a desirable angle while being invisible from an undesirable angle. The directional based graphic further comprises of a plurality of lenticular lenses having a convex external surface at an external portion of the directional based graphic as well as an underlying graphic panel attached to the internal surface of the plurality of lenticular lenses. The convex external surface of the plurality of lenticular lenses determines whether the underlying graphic panel may be visible through the directional based graphic.

These and other features, aspects and advantages of the present invention will become better understood with references to the following drawings, description and claims.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention.

FIG. 4 shows an enlarged view of the shaft of a golf club in accordance with an embodiment of the present invention;

FIG. 5d shows an enlarged view of the directional based graphic in accordance with a further embodiment of the present invention;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any or all of the problems discussed above or may only address one of the problems discussed above. Further, one or more of the problems discussed above may not be fully addressed by any of the features described below.

Figure 1:
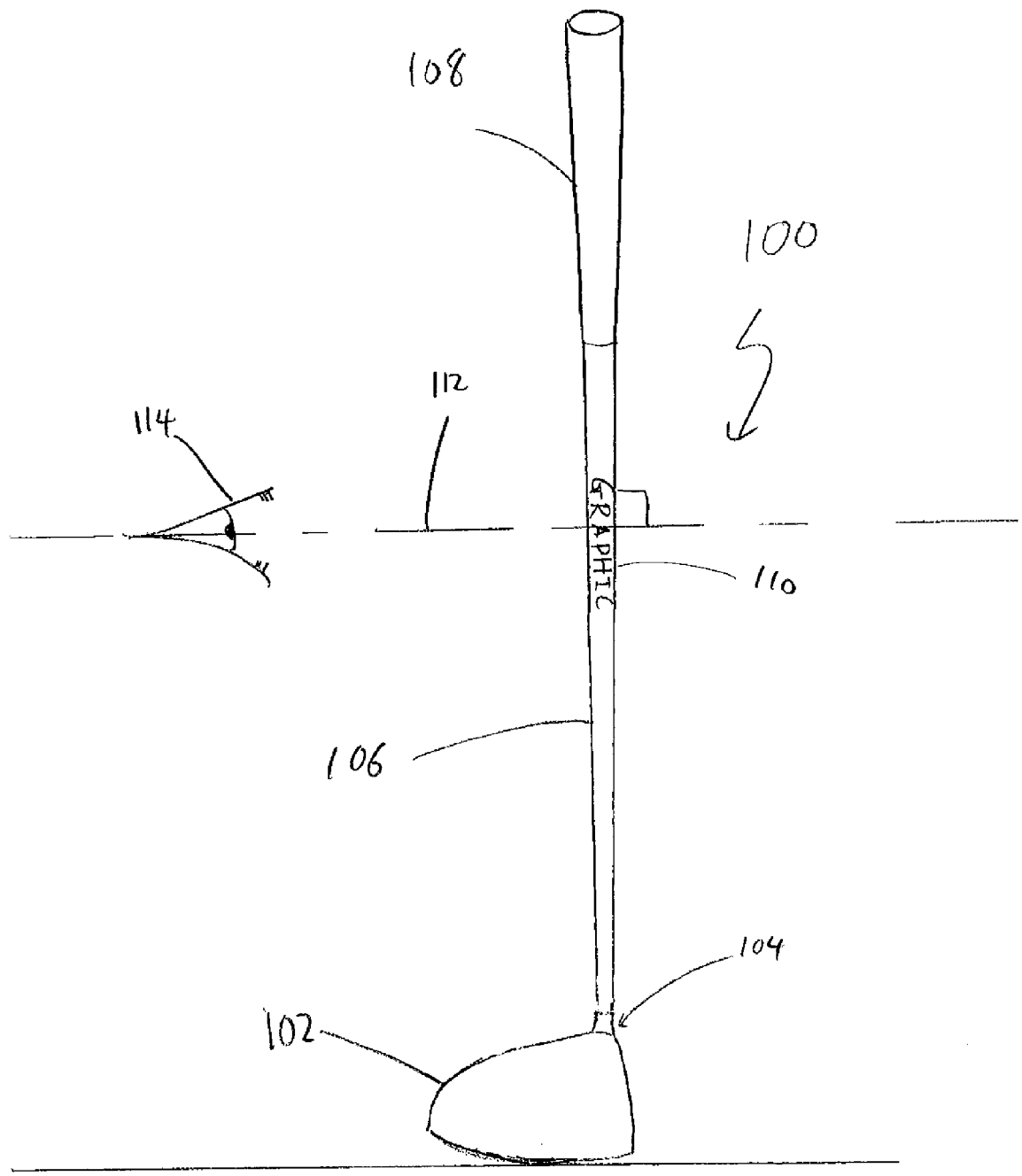
FIG. 1 shows a prospective view of a golf club in accordance with an embodiment of the present invention.

FIG. 1 shows a prospective view of a golf club 100 in accordance with an exemplary embodiment of the present invention. In this exemplary embodiment, it can be seen that the golf club 100 has a head 102 placed at a distal end of the golf club 100 with a hosel extending upwards from the crown of the golf club head 102. Connected to the club head 102 is a shaft 106 stemming from the hosel part of the golf club head 102 with a ferrule 104 placed over the hosel. Finally, a grip 108 connected to a proximal end of the golf club 100 via the shaft 106 opposite of the head 102. It should be noted that in the current exemplary embodiment, the shaft 106 of the current golf club 100 may have a directional based graphic 110 on the shaft itself that can only be seen from a desirable angle wherein the line of vision 112 stemming from the viewer's eyes 114 is substantially perpendicular to the shaft 106. It may be beneficial to have the directional based graphic 110 only be visible from this desirable angle because a golfer may generally read the directional based graphic 110 on the shaft 106 from a substantially perpendicular orientation.

Directional based graphic 110 on shafts 106 may be comprised of numerous mixtures of numbers, letters, symbols, decorative patterns, or even logos that add to the aesthetic appeal of the golf club 100. The directional based graphic 110, in order to maximize exposure and readability on a tubular shaped shaft, may generally run horizontally across the length of the shaft 106, making them more susceptible to be viewed from a pair of eyes 114 that are substantially perpendicular to the shaft 106. Although the directional based graphic 110 may serve the important purpose of conveying a message and a visual stimulant to the golfer; these directional based graphic 110 could potentially distract a golfer when the golfer looks down on the shaft 106 while trying to execute a golf shot.

Figure 2:
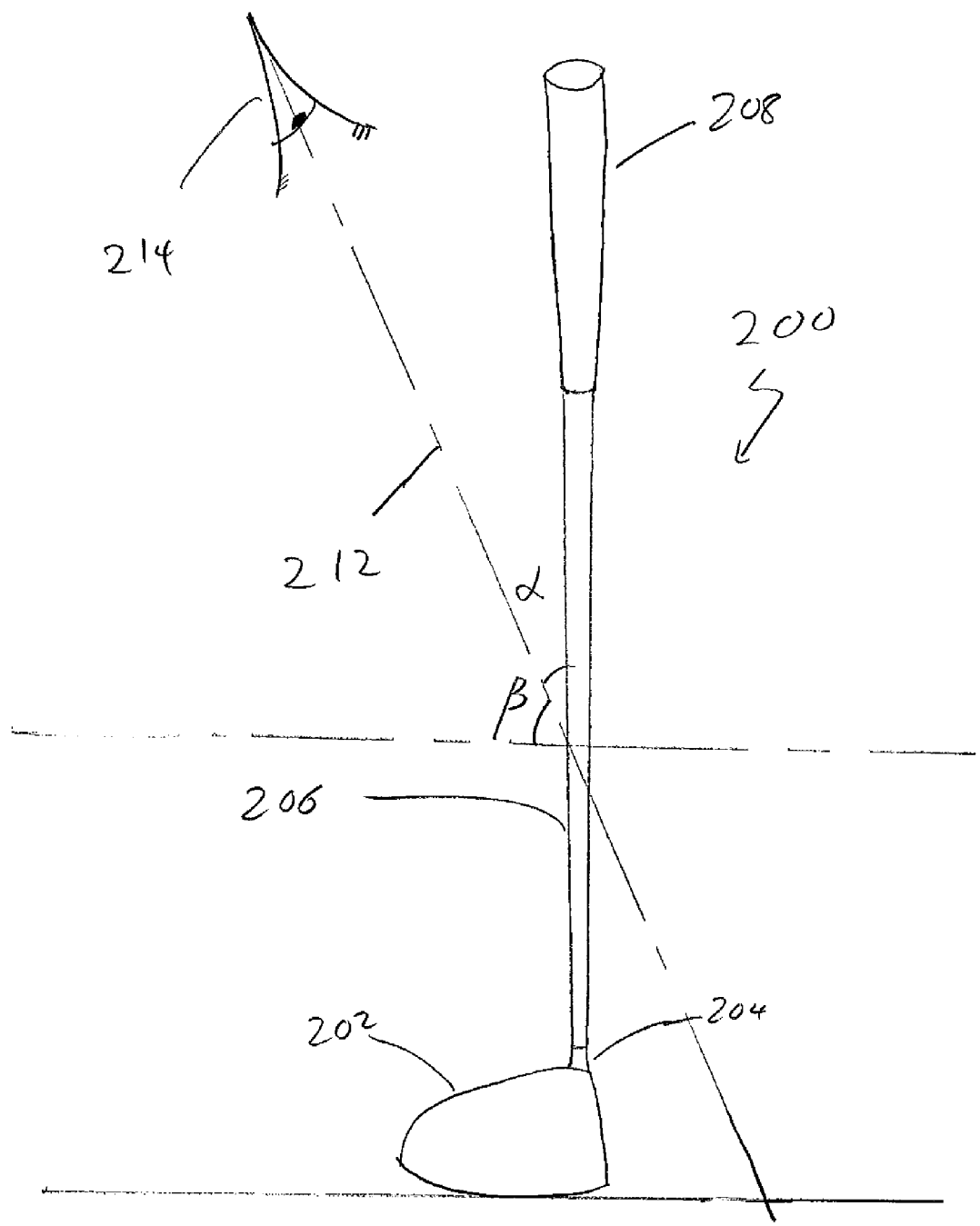
FIG. 2 shows a further prospective view of a golf club in accordance with an embodiment of the present invention.

Because such directional based graphic 110 could be a distraction to the golfer, the directional based graphic 110 in accordance with the current invention may disappear and become invisible once the viewer's eyes 114 are no longer viewing the directional based graphic 110 from an angle that is substantially perpendicular to the shaft 106. In order to further illustrate the disappearance of the directional based graphic 110, FIG. 2 shows an example of a golf club 200 in accordance with the exemplary embodiment of the present invention wherein the directional based graphic 110 shown in FIG. 1 become invisible when the viewer's eyes 214 deviate from the substantially perpendicular direction show in FIG. 1. In this current exemplary embodiment shown in FIG. 2, the line of vision 212 from the viewer's eyes 214 may form an angle α with the shaft 206, which is not substantially perpendicular to the shaft 206. More specifically, angle α may be less than about 85 degrees, more preferably less than about 80 degrees, and most preferably less than about 75 degrees. Alternatively speaking, directional based graphic 110 may only be seen when the line of vision is within an angle β of about 20 degrees of being perpendicular to the shaft 206, more preferably within about 10 degrees of being perpendicular to the shaft 206, and most preferably within about 5 degrees of being perpendicular to the shaft 206.

Because the viewer's eyes 214 are not substantially perpendicular to the shaft 206 in FIG. 2, the directional based graphic 110 that was visible in FIG. 1 from a substantially perpendicular angle is no longer visible, leaving a shaft 206 without any distracting graphic to affect the golfer.

Figure 3:
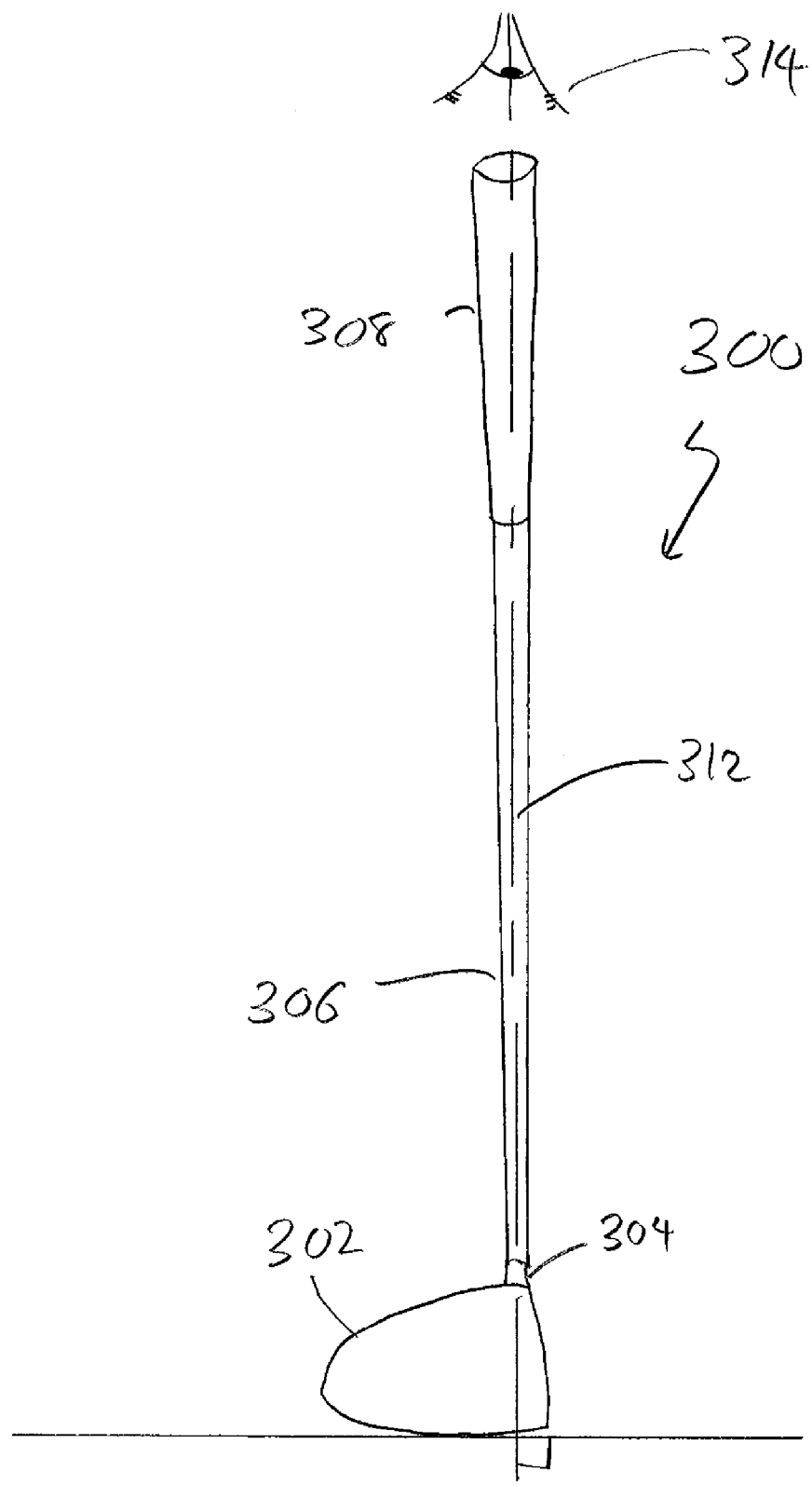
FIG. 3 shows a further prospective view of a golf club in accordance with an embodiment of the present invention.

FIG. 3 shows the golf club 300 in accordance with an exemplary embodiment of the present invention wherein the viewer's eyes 314 may be looking at the golf club 300 from an address position parallel to and directly down the shaft 306. As it can be seen from FIG. 3, the line of vision 312 being directly parallel to the shaft 306, creates an angle of about 0 degrees between the line of vision 312 and the shaft 306. When the golf club 300 is viewed from the address position, the directional based graphic 110 that were visible in FIG. 1 are no longer visible because the angle formed between the line of vision 312 from the viewer's eyes 314 and the shaft 306 is about 0 degrees. It may generally be desirable for the shaft directional based graphic 110 to be invisible when the golf club 300 sits in the address position as it minimize the exposure and distraction of the directional based graphic 110 on the golfer.

In order to achieve the directional based appearance and disappearance of the directional based graphic 110 on the golf club, the directional based graphic 110 may need to be visible in one direction while invisible in another direction. FIG. 4 shows an enlarged view of the shaft 406 of an exemplary embodiment of the present invention wherein the directional based graphic 410 further comprise of a plurality of lenticular lenses 420 and an underlying graphic panel 411. The plurality of lenticular lenses 420 combined with the underlying graphic panel 411 allows for the underlying graphic panel 411 to only be visible from a desirable orientation achieving the desirable results of the directional based graphic 110. More specifically, FIG. 4 shows an enlarged side view of the directional based graphic 410 over the shaft 406 containing a plurality of lenticular lenses that only allows the underlying graphic panel 411 to be visible only from a desirable direction that is substantially perpendicular to the shaft 406.

Here, the plurality of lenticular lenses 420, due partially to their curved surfaces, only allow the line of sight 412 from the viewer's eyes 414 to pass directly through the plurality of lenticular lenses 420 and see the underlying graphic panel 411 when it is viewed from a substantially perpendicular orientation. When not viewed from an angle that is substantially perpendicular to the shaft 406, the plurality of lenticular lenses 420 will refract the line of sight 412 from the viewer's eyes 414 away from the underlying graphic panel 411, preventing the viewer's eyes to see the underlying graphic panel 411. Utilizing the lenticular lenses 420 on the shaft 406 to cover up the underlying graphic panel 411 will allow the underlying graphic panel 411 in the current exemplary embodiment to be visible only from a desirable orientation that is substantially perpendicular to the shaft 406 while at the same time prevent the underlying graphic panel 411 to be seen when the viewer's eyes 414 are looking at the shaft 406 from an undesirable angle that is not substantially perpendicular to the shaft 406. More details on the specifics of lenticular technology can be found in U.S. Pat. No. 3,538,632 to Anderson titled Lenticular Device and Method for Providing Same, U.S. Pat. No. 3,582,329 to Ivanov et. al. titled Method of Making Lenticular Screens, and U.S. Pat. No. 2,833,176 to Ossoinak titled Arrangement for the Exhibition of Dynamic Scenes to an Observer in Movement With Respect to a Screen; the disclosures of which have been incorporated by reference herein in their entirety.

Figure 5A:
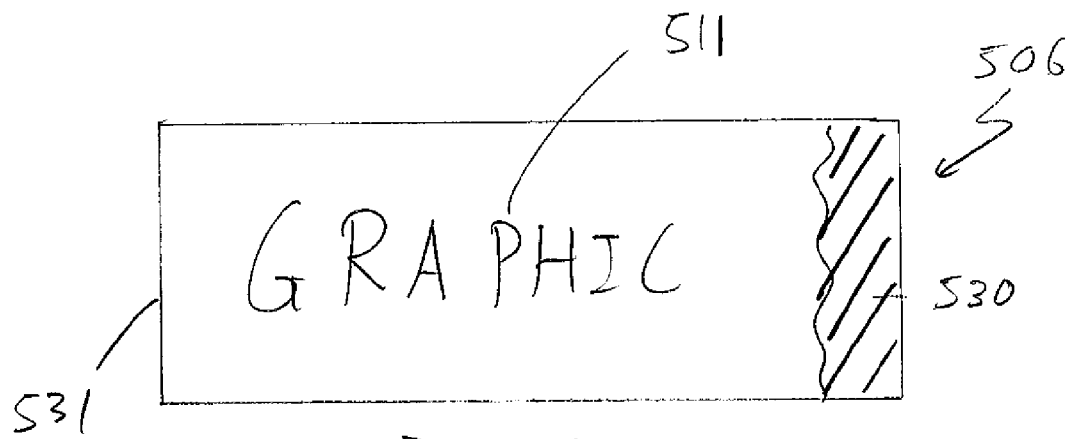
FIG. 5a shows an enlarged view of the directional based graphic in accordance with a further embodiment of the present invention.
Figure 5B:
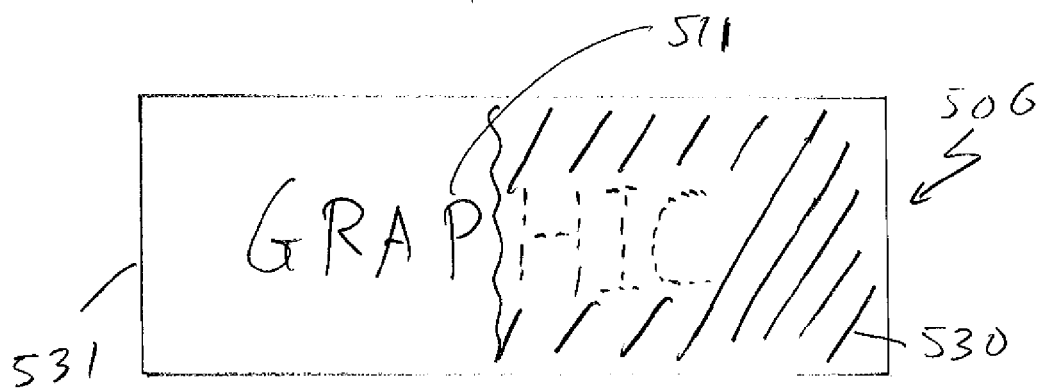
FIG. 5b shows an enlarged view of the directional based graphic in accordance with a further embodiment of the present invention.
Figure 5C:
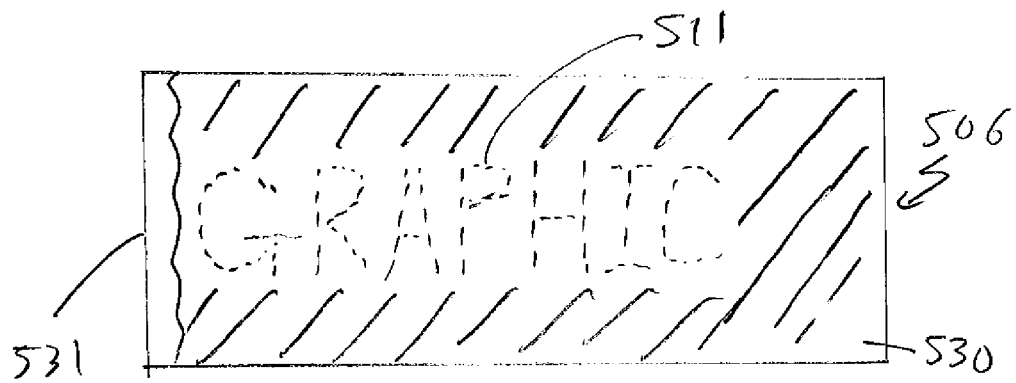
FIG. 5c shows an enlarged view of the directional based graphic in accordance with a further embodiment of the present invention.

FIGS. 5a, 5b, and 5c show alternative embodiment of the present invention wherein the directional based graphic 110 may appear and disappear based on the orientation of the shaft 506. More specifically, the directional based graphic 110 portion of the shaft 506 within this alternative embodiment of the present invention may appear and disappear utilizing a shaft 506 having a clear fluid chamber 531 filled with an opaque fluid 530 that may help cover up the underlying graphic panel 511. Opaque fluid 530, as shown in this current exemplary embodiment in FIGS. 5a, 5b, and 5c may generally flow from one side of the clear fluid chamber 531 to another utilizing gravitational forces resulting from the orientation change. In one orientation shown in FIG. 5a, the shaft 506 is oriented in a direction allowing the viewer's eyes to look at the shaft 506 from a substantially parallel position. In this orientation, the opaque fluid 530 may gather at the shallow end of the clear fluid chamber 531 allowing the underlying graphic panel 511 to show through. In an alternative orientation shown in FIG. 5c, the shaft 506 is oriented in a direction that results from the viewer's eyes looking at the shaft 506 from another position not substantially parallel to the shaft 506. As FIG. 5c shows, under this orientation, the underlying graphic panel 511 is covered by the opaque fluid 530 making the underlying graphic panel 511 invisible. Finally, in another orientation shown in FIG. 5b, the shaft 506 is in an intermediate transition phase between being substantially parallel to the viewer's eyes in FIG. 5a and not being substantially parallel to the viewer's eyes in FIG. 5c. In this intermediate transition phase shown in FIG. 5b, it can be seen that the underlying graphic panel 511 may be partially blocked by the opaque fluid 530 further illustrating the concept behind the appearance and disappearance of the underlying graphic panel 511 under this alternative embodiment of the present invention.

Turning now to FIG. 5d showing a further alternative embodiment of the present invention wherein the clear fluid chamber 531 is filled with a clear fluid instead of an opaque fluid 530, but utilizes a sleeve 532 that travels in and out of the clear fluid chamber 531 to cover up the underlying graphic panel 511. Under this alternative embodiment, the clear fluid may fill up the entire clear fluid chamber 531 and may generally be clear in color so the underlying graphic panel 511 may still be seen when the sleeve 532 is moved away from the underlying graphic panel 511. The clear fluid may generally be used to guide the movement of the sleeve 532 within the clear fluid chamber 531 of the shaft 506 in accordance with the different orientations of shaft 506. In one orientation, when the shaft 506 is positioned substantially perpendicular to the viewer's eyes in a horizontal orientation, the gravitational force will generally force the sleeve 532 to move away from the underlying graphic panel 511, making the underling graphic panel 511 visible. Alternatively, in another orientation when the shaft is not positioned substantially perpendicular to the viewer's eyes but in a vertical orientation, the gravitational force will move the sleeve 532 over the underlying graphic panel 511 concealing the underlying graphic panel 511. It may generally be advantageous to use a sleeve 532 in combination with a clear fluid because this alternative embodiment will allow the entire clear fluid chamber 531 to be filled with a fluid, preventing undesirable sloshing sound that could result from a partially filled clear fluid chamber 531. More details on utilizing a fluid 530 and a sleeve 532 to control the display of the underlying graphic panel 511 may be found in U.S. Pat. No. 2,264,194 to Wuestman titled Advertising Pencil, Pen or the Like and U.S. Pat. No. 4,037,343 to Lonsmin titled Novelty Writing Instrument Having An Appearing And Disappearing Personal Name; the disclosure of both are herein incorporated by reference in their entirety.

Figure 6:
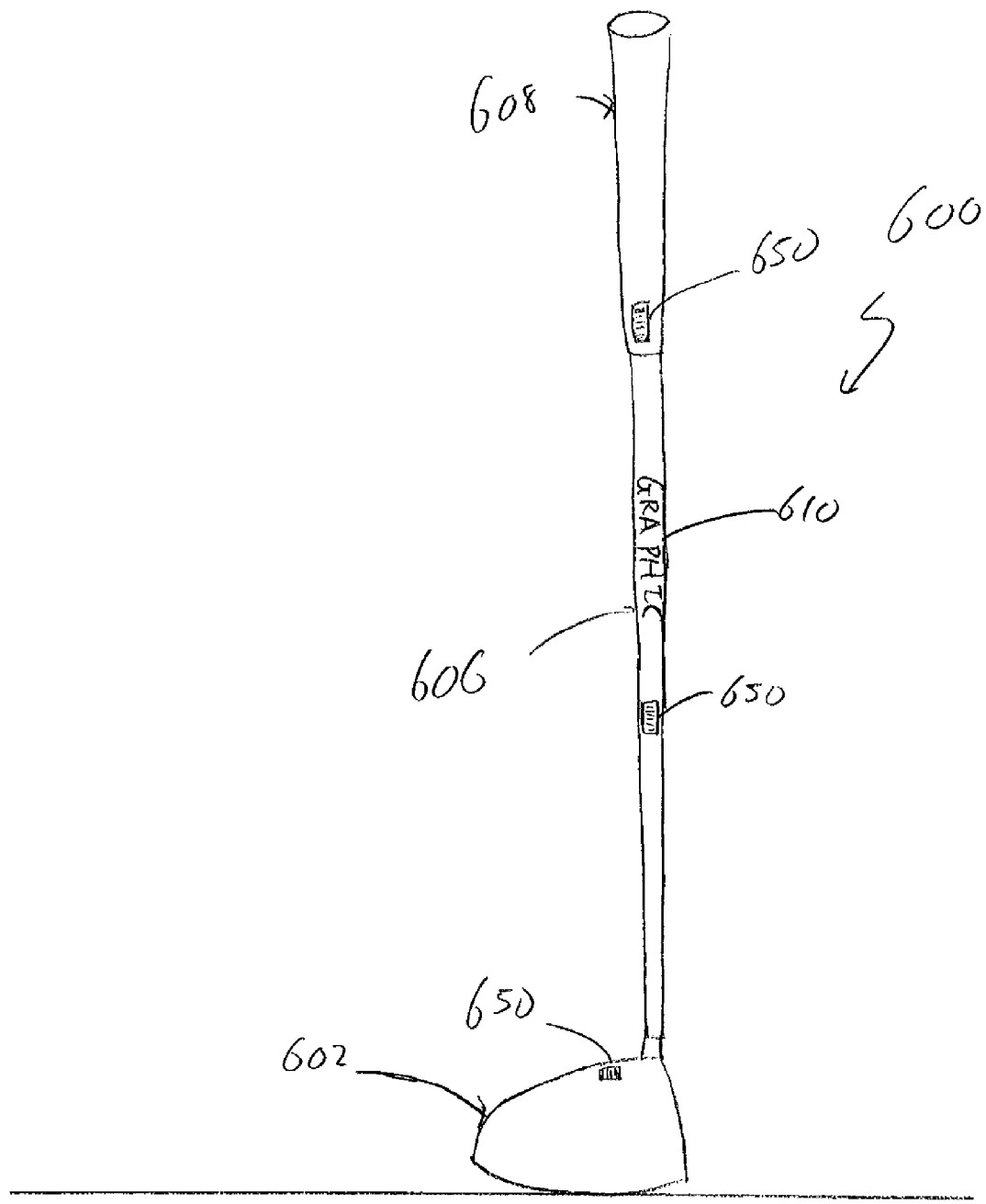
FIG. 6 shows a prospective view of a golf club in accordance with a further embodiment of the present invention.

FIG. 6 shows a further alternative embodiment of the present invention wherein the golf club 600 may utilize an accelerometer 650 to determine the orientation of the shaft 606 which in turn determines the visibility of the directional based graphic 610. An accelerometer 650 may generally measure the acceleration that it experiences relative to freefall in order to detect the magnitude and direction of the acceleration as a vector quantity. This vector quantity can be used to sense the orientation, vibration, or even shock of the accelerometer 650 in order to determine the visibility of the directional based graphic 610 under this embodiment. In one embodiment, the accelerometer 650 may be placed within the grip 608 of the golf club 600 because the grip may generally be oriented in the same direction as the shaft 606 to determine the visibility of the directional based graphic 610. More specifically, the accelerometer 650 shown in FIG. 6 within the grip 608 may help sense the orientation of the golf club 600. When the golf club 600 is oriented in a desirable direction, the accelerometer 650 will allow the directional based graphic 610 to be visible. Alternatively, when the golf club 600 is not oriented in a desirable direction, the accelerometer 650 will not allow the directional based graphic 610 to be seen. More specifically, the directional based graphic 610 in this current embodiment may generally be comprised of a polarized material that may change its visibility based on an electrical signal. This electrical signal may be provided by the accelerometer 650, which turns on and off the polarized directional based graphic 610 depending on the orientation of the golf club 600.

In an alternative embodiment of the present invention, the accelerometer 650 may be placed within the shaft 606 of the golf club 600, as the orientation of the shaft 606 may generally determine whether the directional based graphic 610 should be seen. Finally, in a further alternative embodiment of the present invention, the accelerometer 650 may also be placed within the head 602 of the golf club 100, as certain head orientations will also determine whether the directional based graphic should be visible. It should be noted that the accelerometer 650 shown in FIG. 6 may be placed at either of the above locations, all three of the above locations, or any other location within the golf club 100 so long as it is capable of determining the orientation of the golf club 100 all without departing from the scope and content of the present invention.

Figure 7:
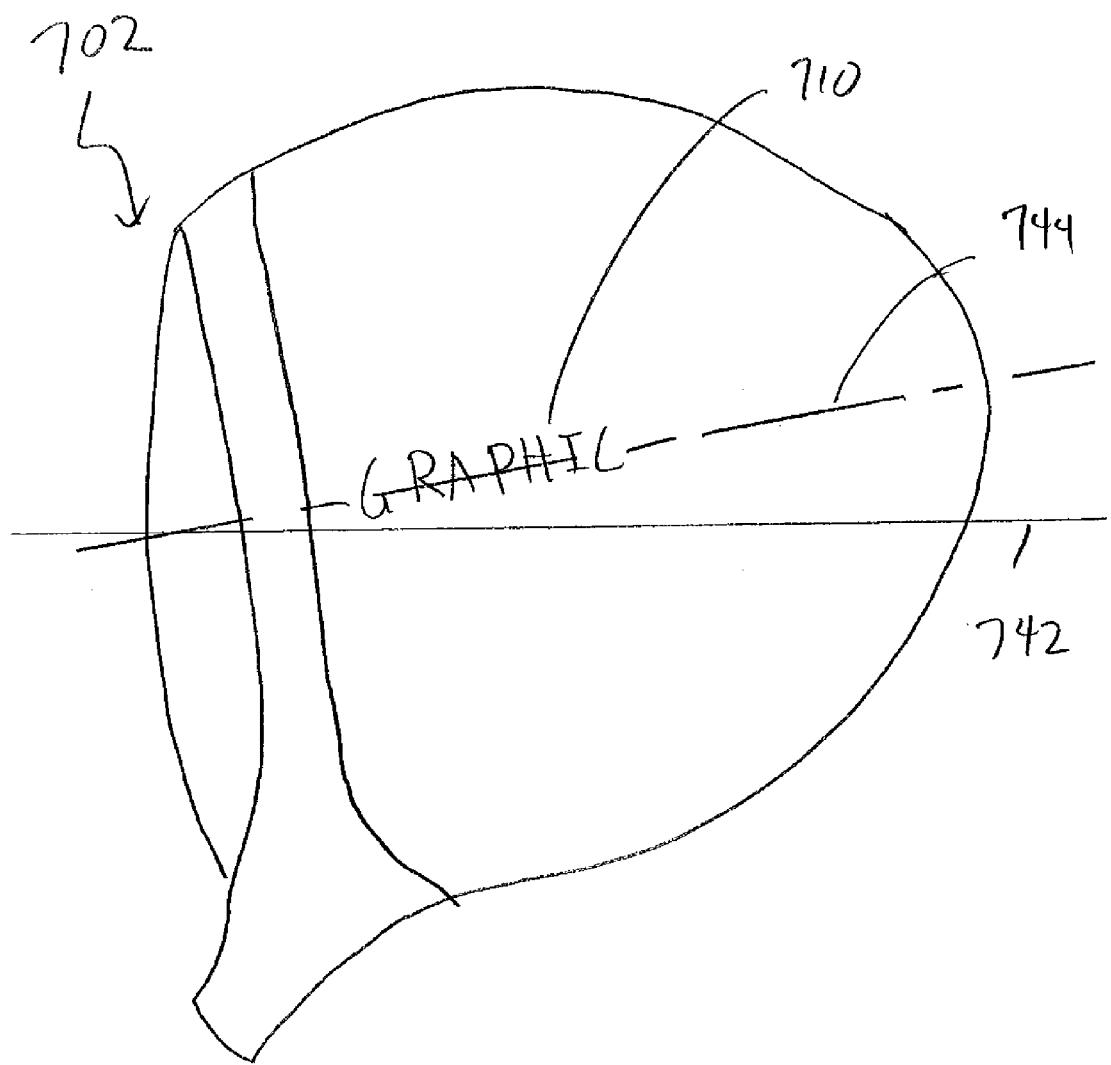
FIG. 7 shows a top view of the head of a golf club in accordance with a further embodiment of the present invention.

FIG. 7 here shows a further alternative embodiment of the present invention wherein directional based graphic 710 may be applied to the crown 740 portion of the golf club head 702 to help with alignment of the golf club head 702 with an intended path 742. Shown here in FIG. 7, the golf club head 702 is pointed away from the intended path 742 as indicated by the misalignment of the central line 744 of the golf club head 702 with the intended path 742. When the central line 744 of the golf club head 702 is not in alignment with the intended path 742, the directional based graphic 710 may become visible to inform the golfer of the misalignment. Directional based graphic 710, as shown in the current exemplary embodiment may resemble letters, numbers, symbols, arrows, or any other shape capable of indicating misalignment all without departing from the scope and content of the present invention. FIG. 7 here shows the directional based graphic 710 being visible when the golf club head 702 is shown in an open orientation.

Figure 8:
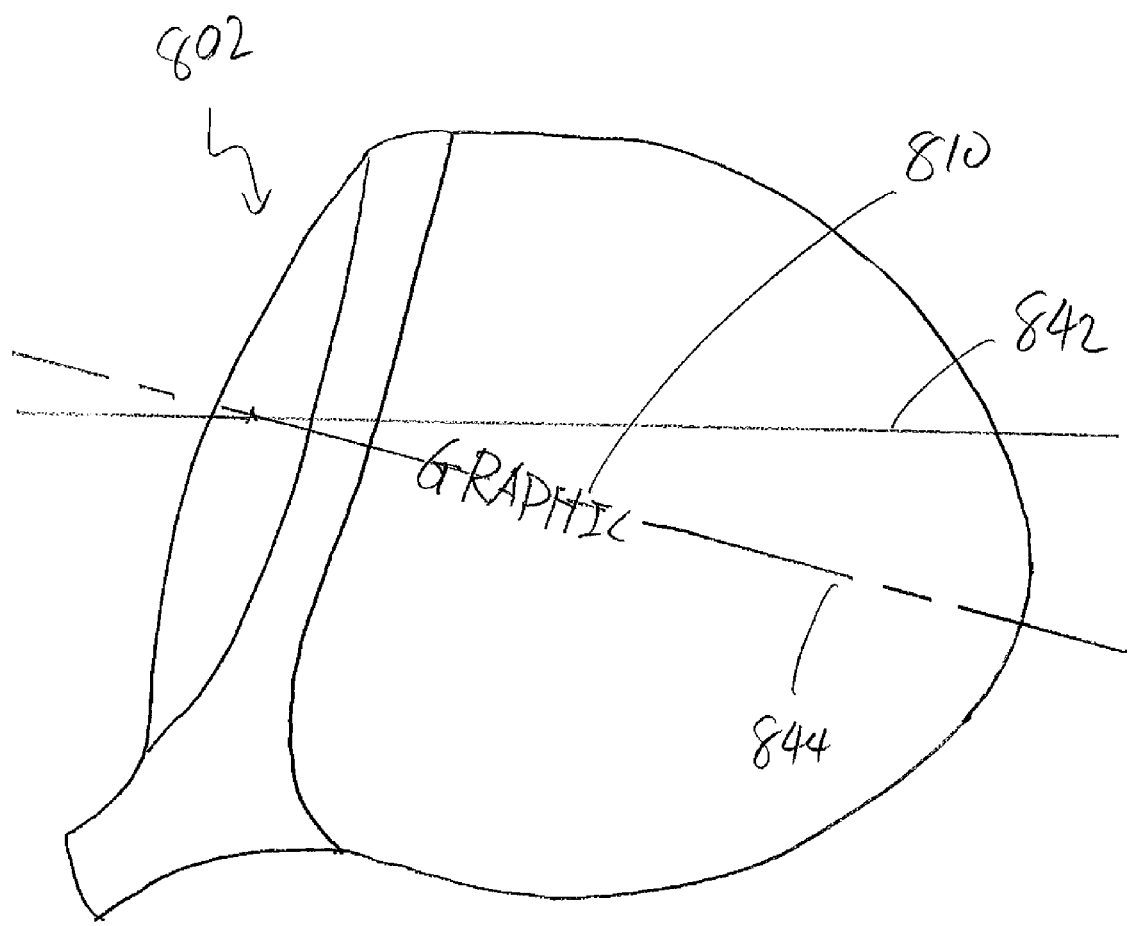
FIG. 8 shows a further top view of the head of a golf club in accordance with a further embodiment of the present invention.

FIG. 8 shows a further alternative embodiment of the present invention wherein the golf club head 802 is in a closed orientation. When golf club head 802 is in a closed position, similar to when a golf club head 802 is in an open position, the central line 844 may generally be misaligned with the intended path 842. When the central line 844 of the golf club head 802 is not in alignment with the intended path 842, the directional based graphic 810 may become visible to inform the golfer of the misalignment. Directional based graphic 810, as shown in the current exemplary embodiment, may resemble letters, numbers, symbols, arrows, or any other shape capable of indicating misalignment all without departing from the scope and content of the present invention.

Figure 9:
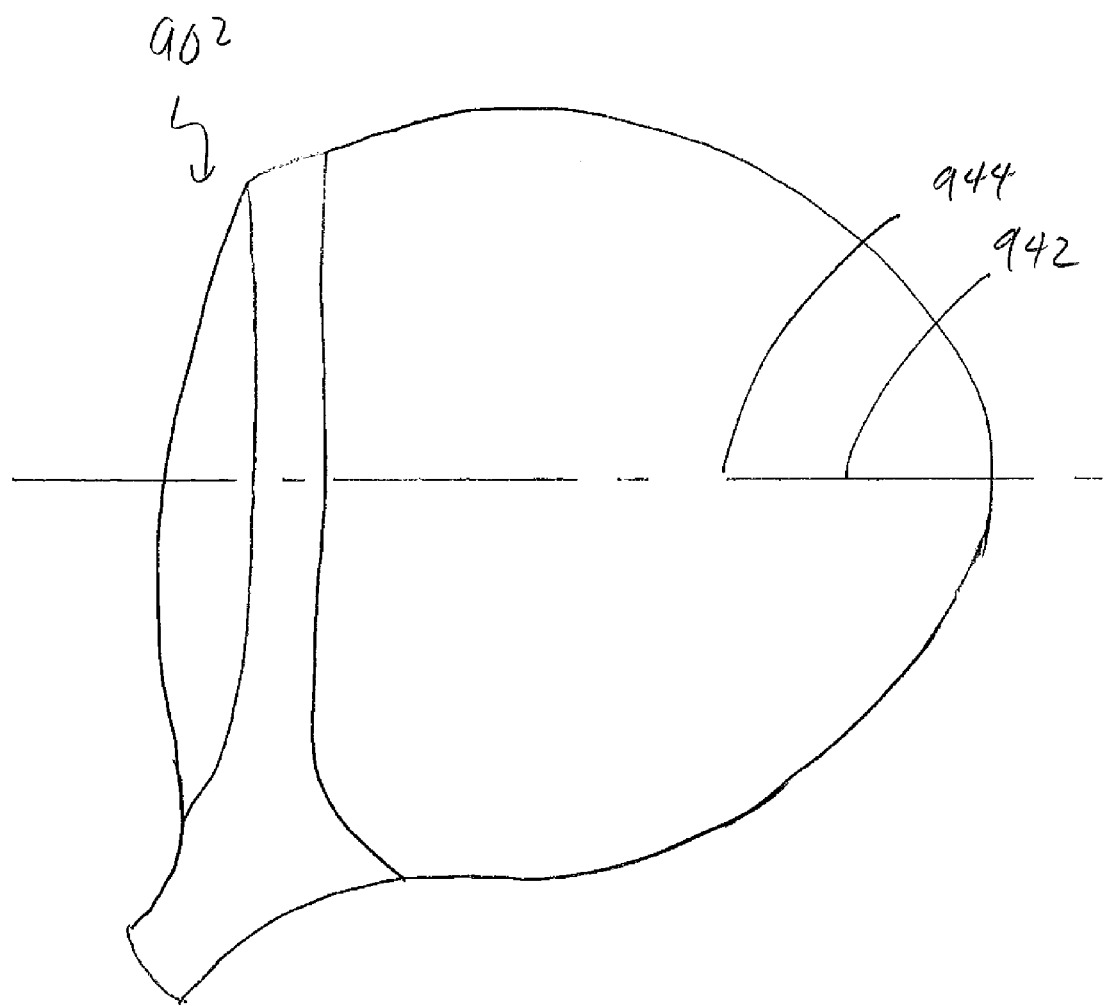
FIG. 9 shows a further top view of the head of a golf club in accordance with a further embodiment of the present invention.

Turning now to FIG. 9, wherein golf club head 902 is properly aligned with the intended path 842, causing the directional based graphic 710 and 810 shown in FIGS. 7 and 8 to disappear. When the golf club head 902 is properly aligned, the intended path 842 overlaps the central line 744, leaving the crown of the golf club head 902 free of any markings. It may generally be desirable to have the directional based graphic 710 and 810 invisible when the golf club head 902 is properly aligned to eliminate distractions that could arise from any graphic display.

In a specific alternative embodiment of the present invention, the directional based graphic 710 and 810 may become invisible by a mere waggling of the golf club 900. More specifically, if a golf club head 902 utilizes graphics that are controlled by a signal producing apparatus such as an accelerometer, such a signal to make the directional based graphics 710 and 810 could be activated by the waggling of the golf club 900 above, causing the directional based graphics 710 and 810 to disappear upon a specific command such as a waggle.

It should be noted that in FIGS. 7, 8, and 9, the golf club head 702, 802, and 902 may be used to determine the variations in face angle of the golf club head. However, the directional based graphic 710 and 810 display may also be used to determine variations in lie angle or loft angle of the golf club head 702, 802, and 902 utilizing the same directional based graphic 710 and 810 without departing from the scope and content of the present invention. Moreover, although it may be preferable to have the directional based graphic 710 and 810 be invisible when the golf club head 702, 802, and 902 is properly aligned, the directional based graphic 710 and 810 could be visible only when the golf club head 702, 802, and 902 is properly aligned without departing from the scope and content of the present invention.

Figure 10:
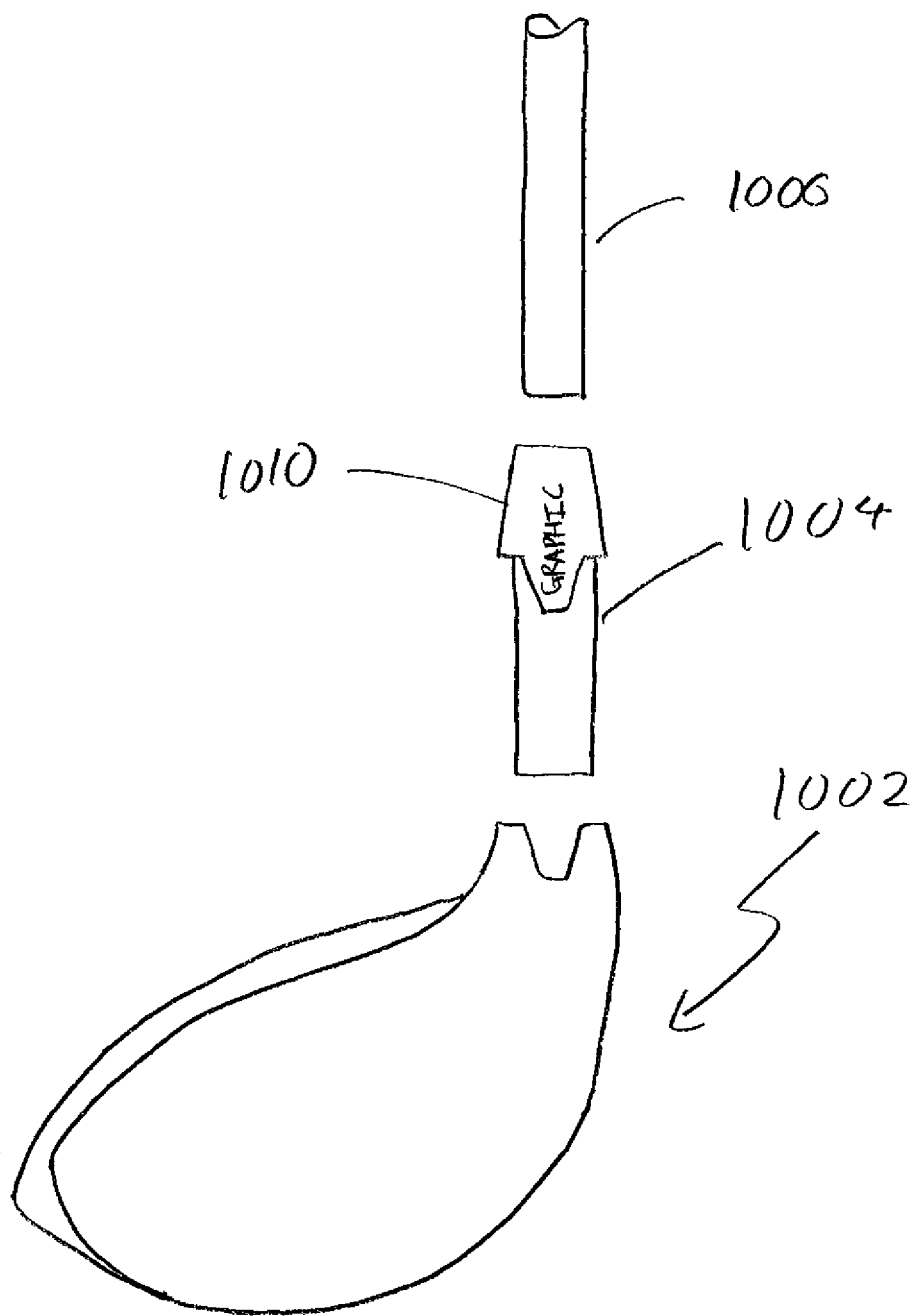
FIG. 10 shows an enlarged view of the hosel of a golf club in accordance with a further embodiment of the present invention.

FIG. 10 shows a further alternative embodiment of the present invention wherein the directional based graphic 1010 may be used on the hosel 1004 of the golf club to help with the matching and orientating of the hosel 1004 with the various settings generally needed to identify various orientations of an adjustable hosel 1004. More specifically, the directional based graphic 1010 may be used to show certain connection based labels such as being open, closed, or neutral only when the hosel 1004 and the golf club head 1002 combine with each other to generate the appropriate orientation. For example, the directional based graphic 1010 may show an open setting when the hosel 1004 and the golf club head 1002 combine to create a golf club head 1002 that has an open face angle. Alternatively, the directional based graphic 1010 may show a closed setting when the hosel 1004 and the golf club head 1002 combine to create a golf club head 1002 that has a closed face angle.

Figure 11:
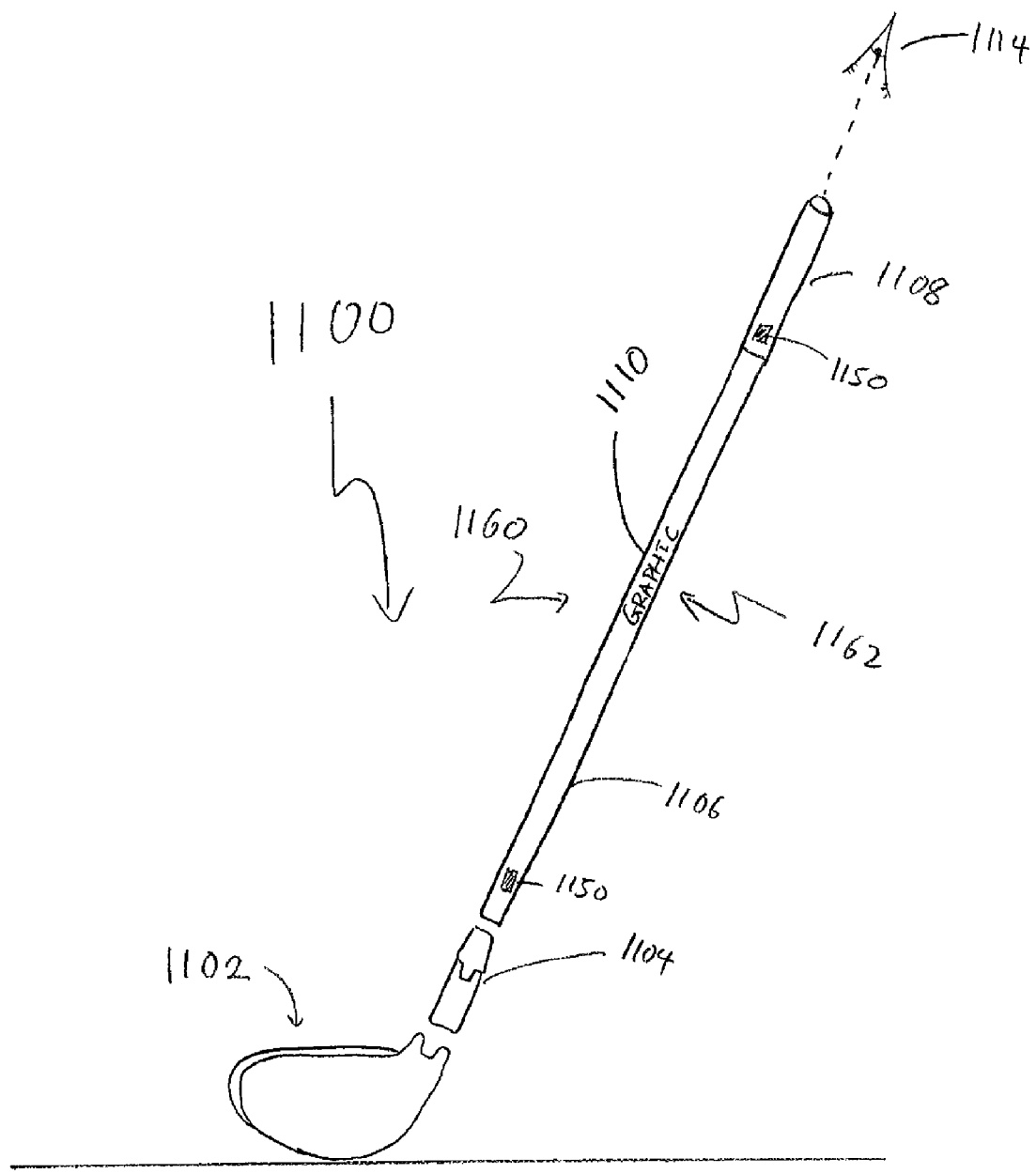
FIG. 11 shows a prospective view of a golf club in an address position in accordance with a further embodiment of the present invention.

FIG. 11 shows a prospective view of a golf club 1100 in accordance with a further alternative embodiment of the present invention at an address position. Golf club 1100 shown in FIG. 11 at an address position allows for a better distinction of the top side 1160 of the shaft 1106 from the bottom side 1162 of the shaft 1106. As it has been shown by the prior figures, it may generally be desirable to only have the directional based graphic 1110 be visible from the bottom side 1162 of the shaft 1106 because it does not create a distraction for the golfer. In this alternative embodiment of the present invention, the golf club is capable of recognizing the orientation of the shaft 1106 relative to the head 1102 via the adjustable hosel 1104 utilizing an accelerometer 1150. Once the orientation of the shaft 1106 relative to the head 1102 is determined, the accelerometer may send an electronic signal to the directional based graphic 1110 to be only visible on the bottom side 1162 of the shaft 1106 while keeping all other directional based graphic 1110 completely invisible. Under this embodiment, the directional based graphic 1110 is determined based purely on the orientation of the shaft 1106 relative to the club head 1102 and stays constantly visible from the bottom side 1162 of the shaft 1106 regardless of the orientation of the actual club.

Although FIG. 11 shows the golf club 1100 utilizing an accelerometer 1150 at either the grip end of the golf club 1100 or the tip end of the shaft 1106, the accelerometer 1150 could be placed at any location within the golf club 1100 so long as it is capable of determining the relative position of the shaft 1106 with respect to the head 1102 without departing from the scope and content of the present invention. In lieu of utilizing an accelerometer 1150, the golf club 1100 shown in FIG. 11 could use various connection sensors within the adjustable hosel 1104 itself to determine the orientation of the shaft 1106 relative to the head 1102 to achieve the same objective of only activating the directional based graphic 1110 without departing from the scope and content of the present invention. Of course, under this embodiment shown in FIG. 11, the shaft 1106 will have to have a plurality of directional based graphic 1110 around the circumference of the shaft 1106, only to have the appropriate directional based graphic 1110 at the bottom side 1162 of the shaft 1106 activated based on the relative position of the shaft 1106 to the head 1102.

In a further alternative embodiment of the present invention, the golf club described above could contain a combination of one or more of the graphics to achieve multiple purposes without departing from the scope and content of the present invention. More specifically, a golf club could contain the directional based graphic on both the shaft and the head to allow for a non-distracting shaft graphic as well as an alignment aid. Alternatively, a golf club could also contain the directional based graphic on the head and the hosel to help with both the alignment and to help identify the various settings of an adjustable hosel. Finally, a golf club could also contain the directional based graphic on the shaft and the hosel to allow for a non-distracting shaft graphic as well as helping to identify the various settings of an adjustable hosel all without departing from the scope and content of the present invention.

It should be noted that the term "graphic" used in all the proceeding figures are not limited to the specific characters of g, r, a, p, h, i, and c, but relate generally to any sort of visual illustrations without departing from the scope and content of the present invention. More specifically, graphic, as referred to in the figures above could refer to a company logo, a company name, a product logo, a product name, a graphical display, an alignment arrow, an alignment logo, an alignment dot, an alignment line, any types of characters, any type of numbers, or any visual illustration capable of providing a visual feedback all without departing from the scope and content of the present invention.

Other than in the operating example, or unless otherwise expressly specified, all of the numerical ranges, amounts, values and percentages such as those for amounts of materials, moment of inertias, center of gravity locations, loft, draft angles, various performance ratios, and others in the following portions of the specification may be read as if prefaced by the word "about" even though the term "about" may not expressly appear in the value, amount, or range. Accordingly, unless indicated to the contrary, the numerical parameters set forth in the following specification and attached claims are approximations that may vary depending upon the desirable properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

It should be understood, of course, that the foregoing relates to exemplary embodiments of the present invention and that modifications may be made without departing from the spirit and scope of the invention as set forth in the following claims.

What is claimed is:

1. A golf club comprising:
   a grip at a proximal end of the golf club;
   a head at a distal end of the golf club; and
   a shaft connected between the grip and the head, the shaft having a shaft axis,
   wherein the shaft or club head comprises at least one mechanical or electrical structure that selectively controls viewing of a directional based graphic on a portion of the surface of the shaft or club head, the at least one mechanical or electrical structure configured to cause the directional based graphic to be invisible to a golfer at a viewing angle when the golfer is in an address position holding the golf club and viewing the portion of the surface of the shaft or club head, and configured to cause the directional based graphic to become visible to the golfer at least when the golfer is viewing the portion of the surface of the shaft or club head at a viewing angle substantially perpendicular to the shaft axis, and further wherein the at least one mechanical or electrical structure comprises:

a plurality of lenticular lenses having a convex external surface at an external portion of the at least one mechanical or electrical structure, and an underlying graphic panel attached to an internal surface of the plurality of lenticular lenses, wherein the convex external surface of the plurality of lenticular lenses determines whether the underlying graphic panel may be visible.

2. The golf club of claim 1, wherein said convex external surface of said plurality of lenticular lenses leaves a viewer's line of sight unaltered when viewed from a desirable angle.

3. The golf club of claim 2, wherein said convex external surface of said plurality of lenticular lenses alters said viewer's line of sight when viewed from an undesirable angle that is not substantially perpendicular to said shaft axis.

4. A golf club comprising:
a grip at a proximal end of the golf club;
a head at a distal end of the golf club; and
a shaft connected between the grip and the head, the shaft having a shaft axis,
wherein the shaft or club head comprises at least one mechanical or electrical structure that selectively controls viewing of a directional based graphic on a portion of the surface of the shaft or club head, the at least one mechanical or electrical structure configured to cause the directional based graphic to be invisible to a golfer at a viewing angle when the golfer is in an address position holding the golf club and viewing the portion of the surface of the shaft or club head, and configured to cause the directional based graphic to become visible to the golfer at least when the golfer is viewing the portion of the surface of the shaft or club head at a viewing angle substantially perpendicular to the shaft axis, and further wherein the at least one mechanical or electrical structure comprises:
a clear fluid chamber encompassing the shaft;
an opaque fluid within the fluid chamber; and
an underlying graphic panel attached to an internal surface of the clear fluid chamber;
wherein the opaque fluid's position within the clear fluid chamber determines whether the underlying graphic panel may be visible.

5. The golf club of claim 4, wherein said opaque fluid covers up said underlying graphic panel when viewed from an undesirable angle that is not substantially perpendicular to said shaft axis.

6. The golf club of claim 5, wherein said opaque fluid moves away from said underlying graphic panel when viewed from said desirable angle.

7. A golf club comprising:
a grip at a proximal end of the golf club;
a head at a distal end of the golf club; and
a shaft connected between the grip and the head, the shaft having a shaft axis,
wherein the shaft or club head comprises at least one mechanical or electrical structure that selectively controls viewing of a directional based graphic on a portion of the surface of the shaft or club head, the at least one mechanical or electrical structure configured to cause the directional based graphic to be invisible to a golfer at a viewing angle when the golfer is in an address position holding the golf club and viewing the portion of the surface of the shaft or club head, and configured to cause the directional based graphic to become visible to the golfer at least when the golfer is viewing the portion of the surface of the shaft or club head at a viewing angle substantially perpendicular to the shaft axis, and further wherein the at least one mechanical or electrical structure further comprises:
a clear fluid chamber encompassing the shaft;
a clear fluid within the clear fluid chamber;
an underlying graphic panel attached to an internal surface of the clear fluid chamber; and
a sleeve within the clear fluid chamber gliding within the clear fluid chamber between a visible position and an invisible position.

8. The golf club of claim 7, wherein said invisible position is achieved when said sleeve glides over and completely covers said underlying graphic panel when viewed from an undesirable angle that is not substantially perpendicular to said shaft axis.

9. The golf club of claim 8, wherein said visible position is achieved when said sleeve glides away from and completely exposes said underlying graphic panel when viewed from said desirable angle that is substantially perpendicular to said shaft axis.

10. A golf club comprising:
a grip at a proximal end of the golf club;
a head at a distal end of the golf club; and
a shaft connected between the grip and the head, the shaft having a shaft axis,
wherein the shaft or club head comprises at least one mechanical or electrical structure that selectively controls viewing of a directional based graphic on a portion of the surface of the shaft or club head, the at least one mechanical or electrical structure configured to cause the directional based graphic to be invisible to a golfer at a viewing angle when the golfer is in an address position holding the golf club and viewing the portion of the surface of the shaft or club head, and configured to cause the directional based graphic to become visible to the golfer at least when the golfer is viewing the portion of the surface of the shaft or club head at a viewing angle substantially perpendicular to the shaft axis, and further wherein the at least one mechanical or electrical structure comprises an accelerometer configured to determine the visibility of the at least one directional based graphic based on a desirable angle.

\* \* \* \* \*